Nov. 14, 1961  R. D. HAYES ET AL  3,008,865
METHOD AND APPARATUS FOR MAKING BAGS
Filed June 25, 1957  15 Sheets-Sheet 1
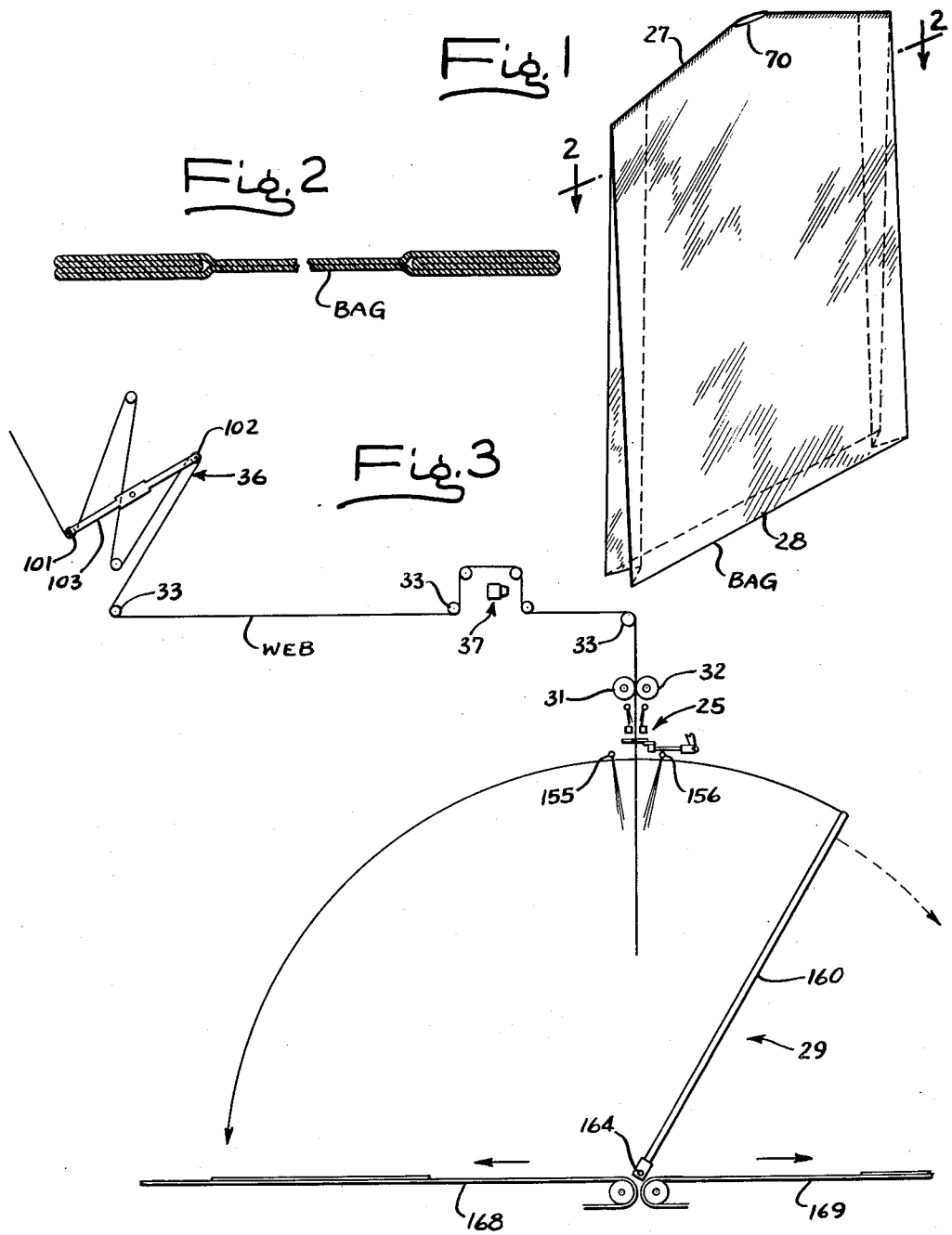
INVENTORS
RICHARD D. HAYES
DWIGHT E. CLARK
ATTYS.

Fig. 4

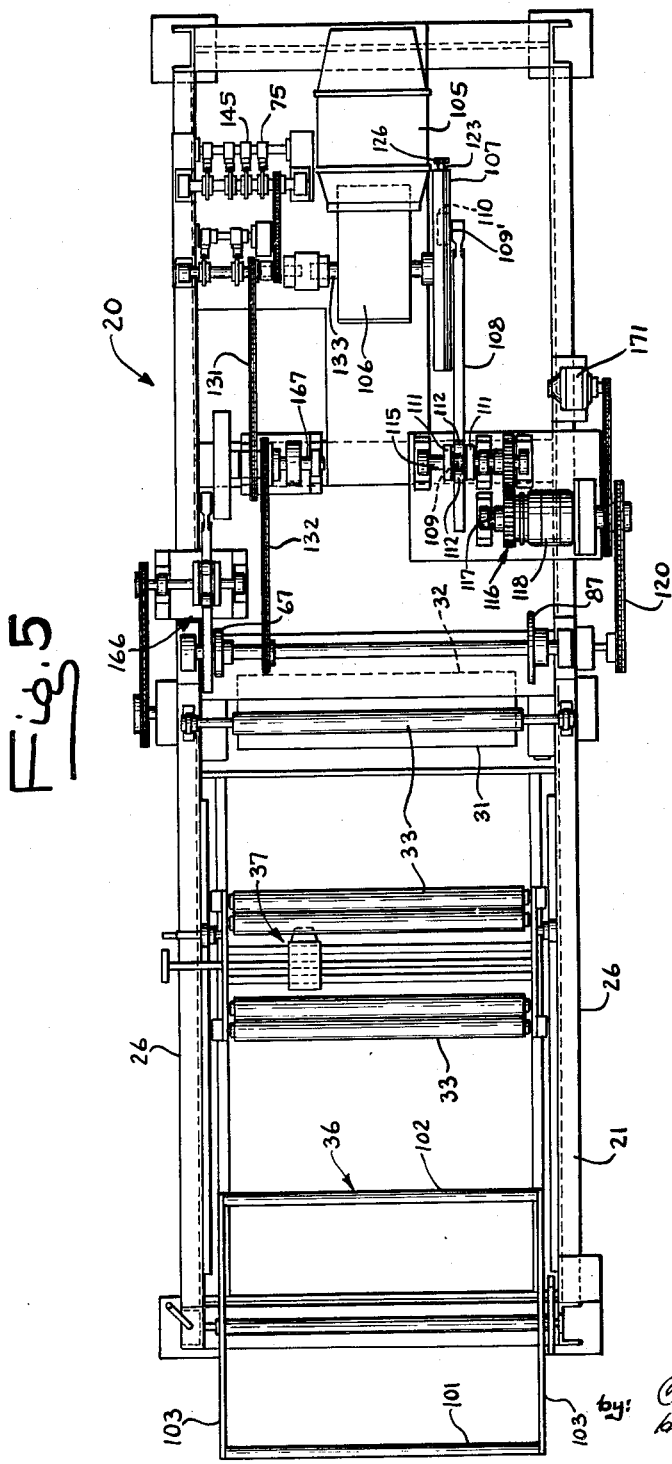

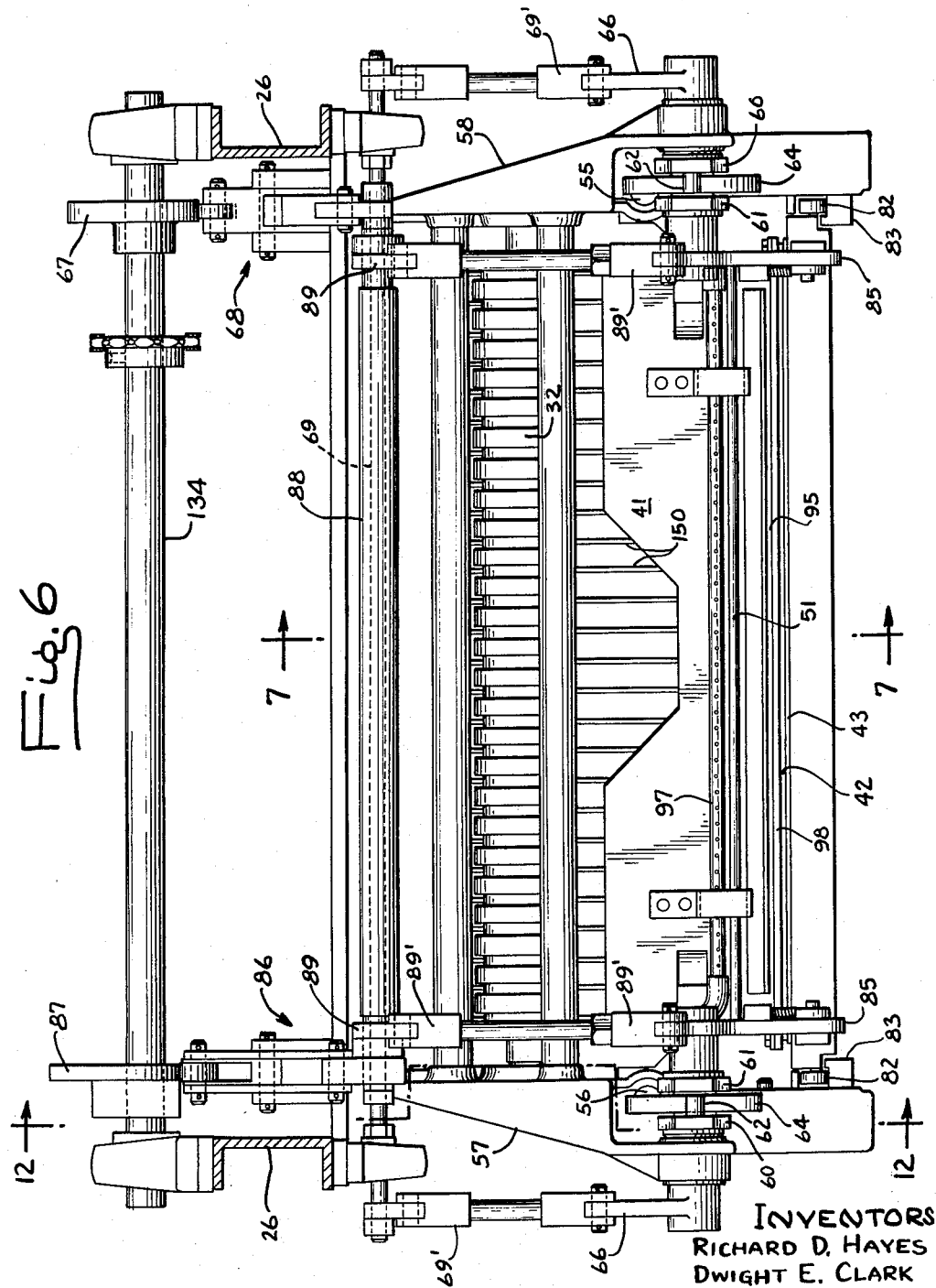

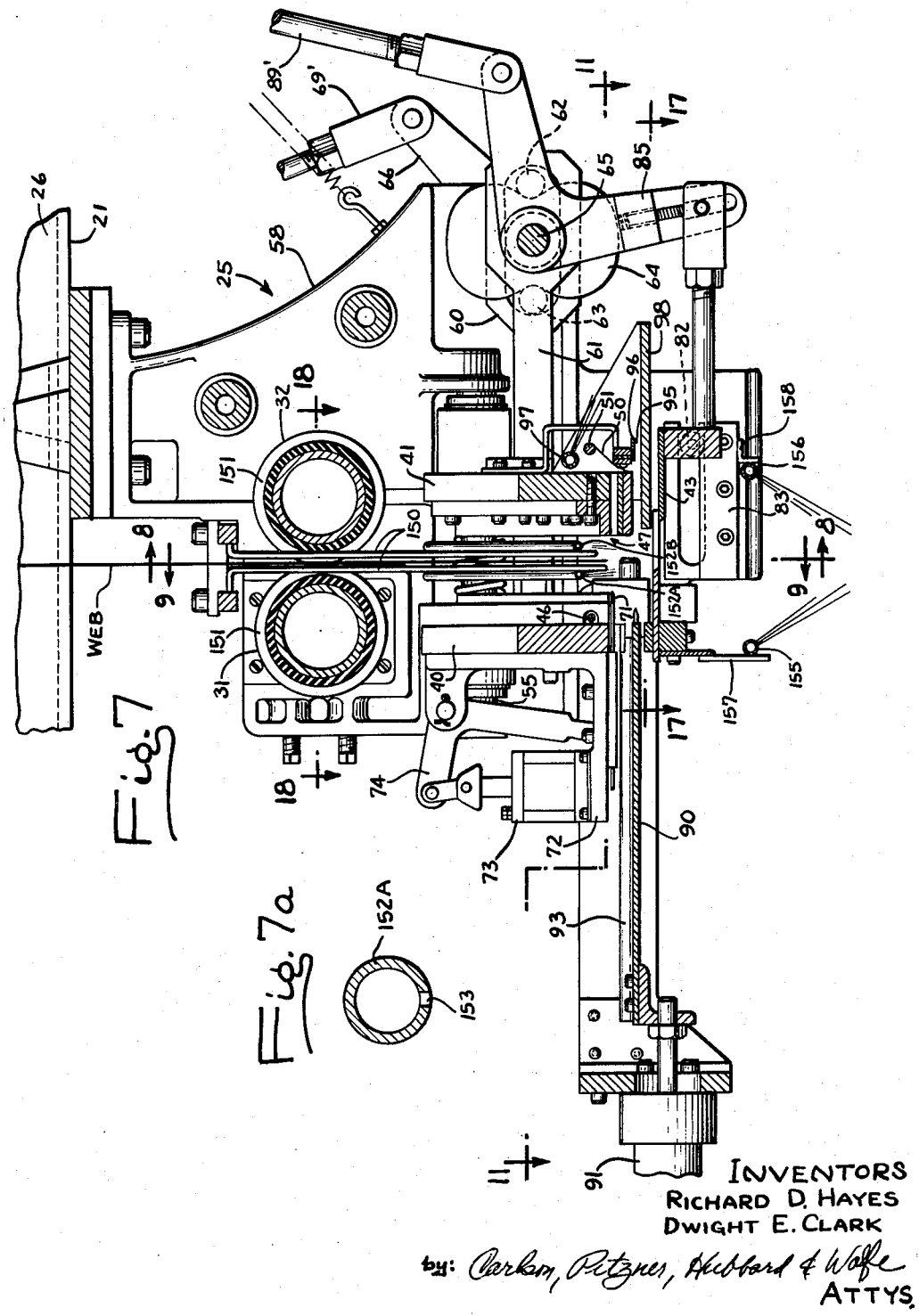

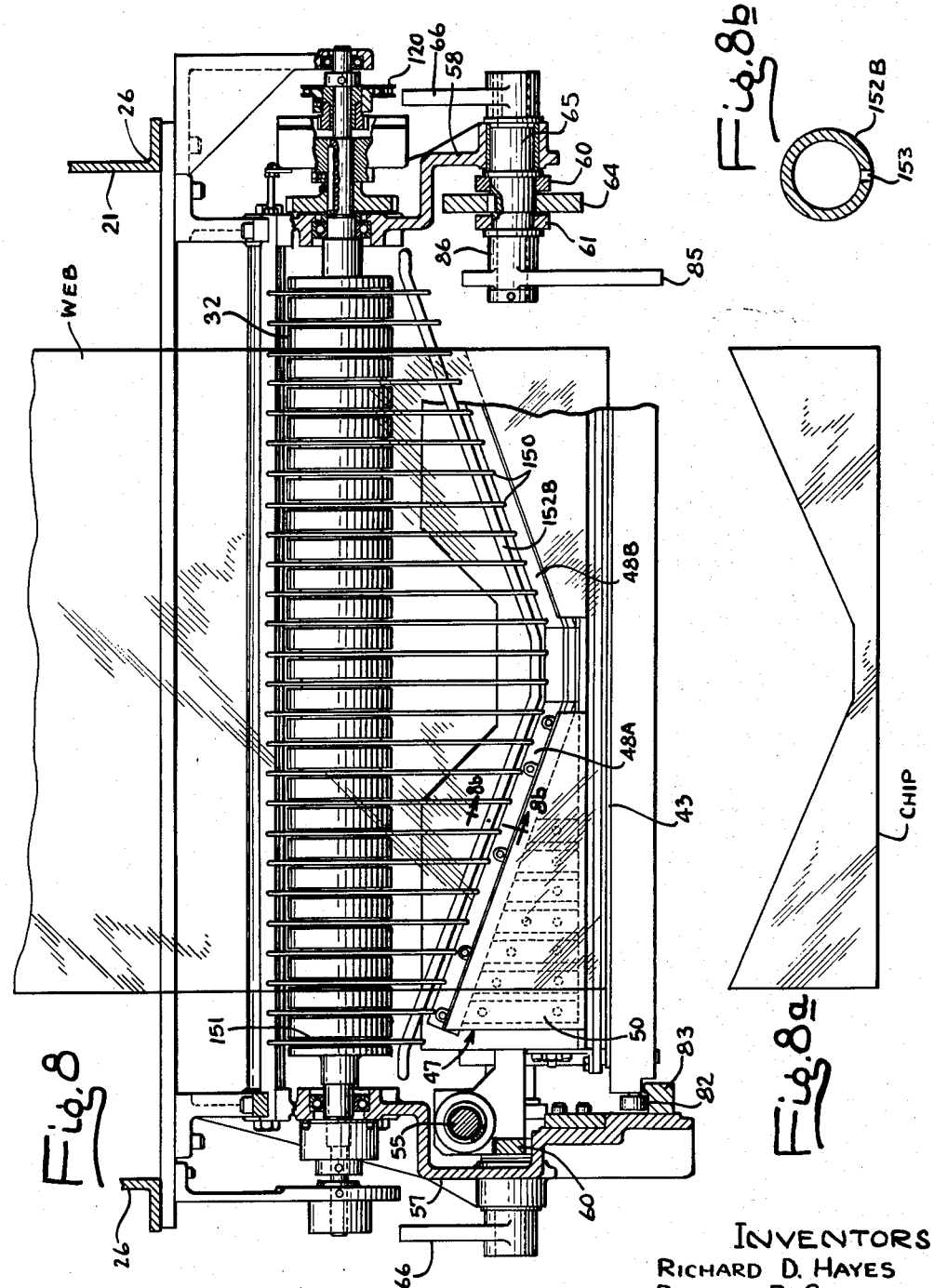

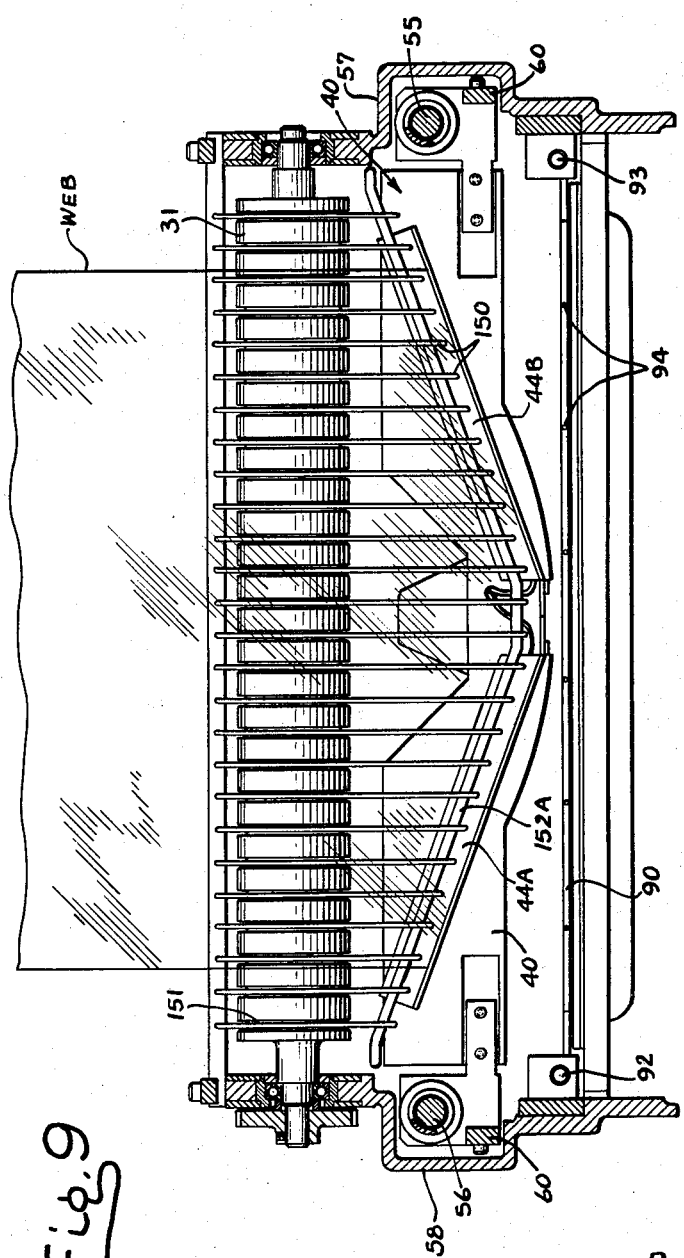

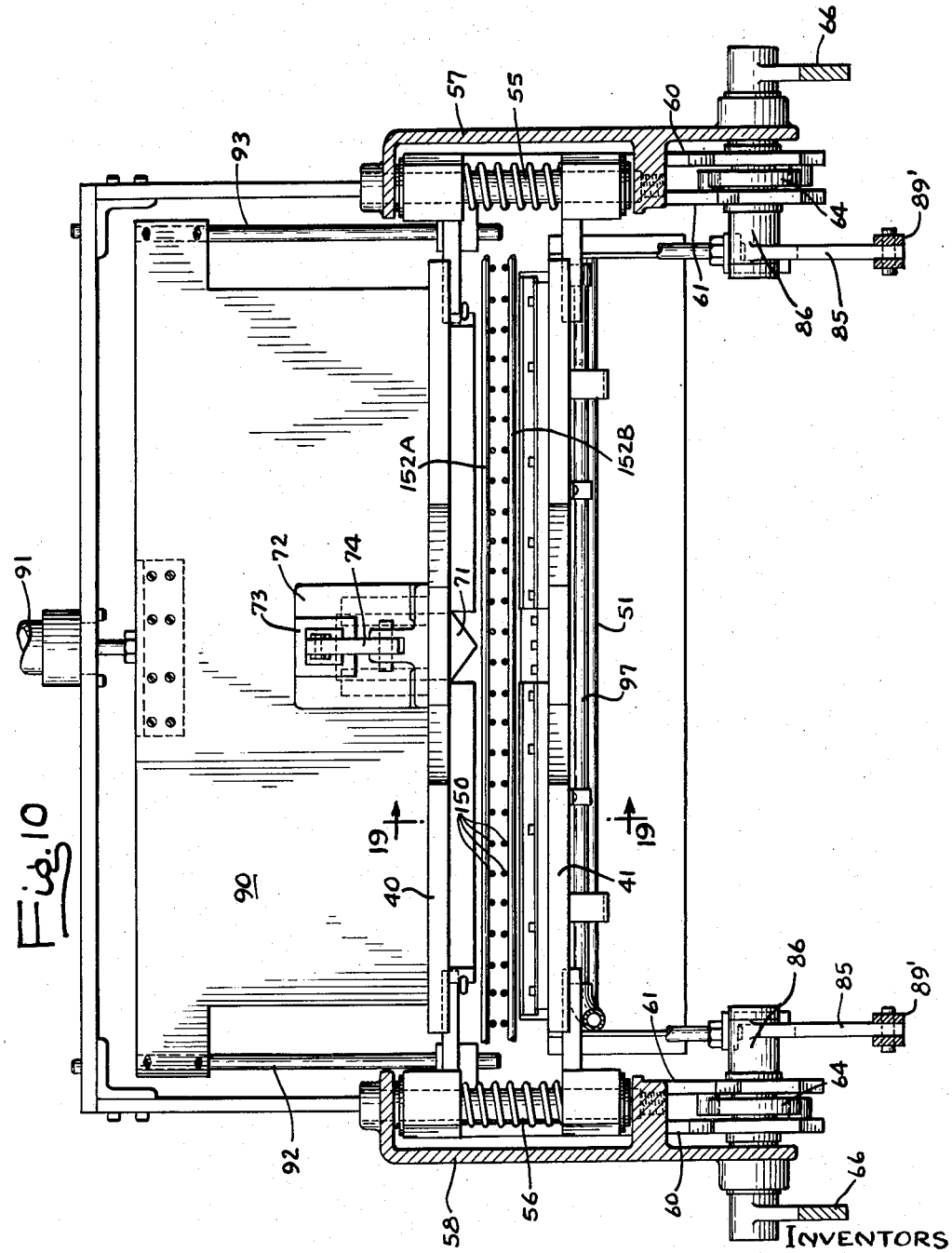

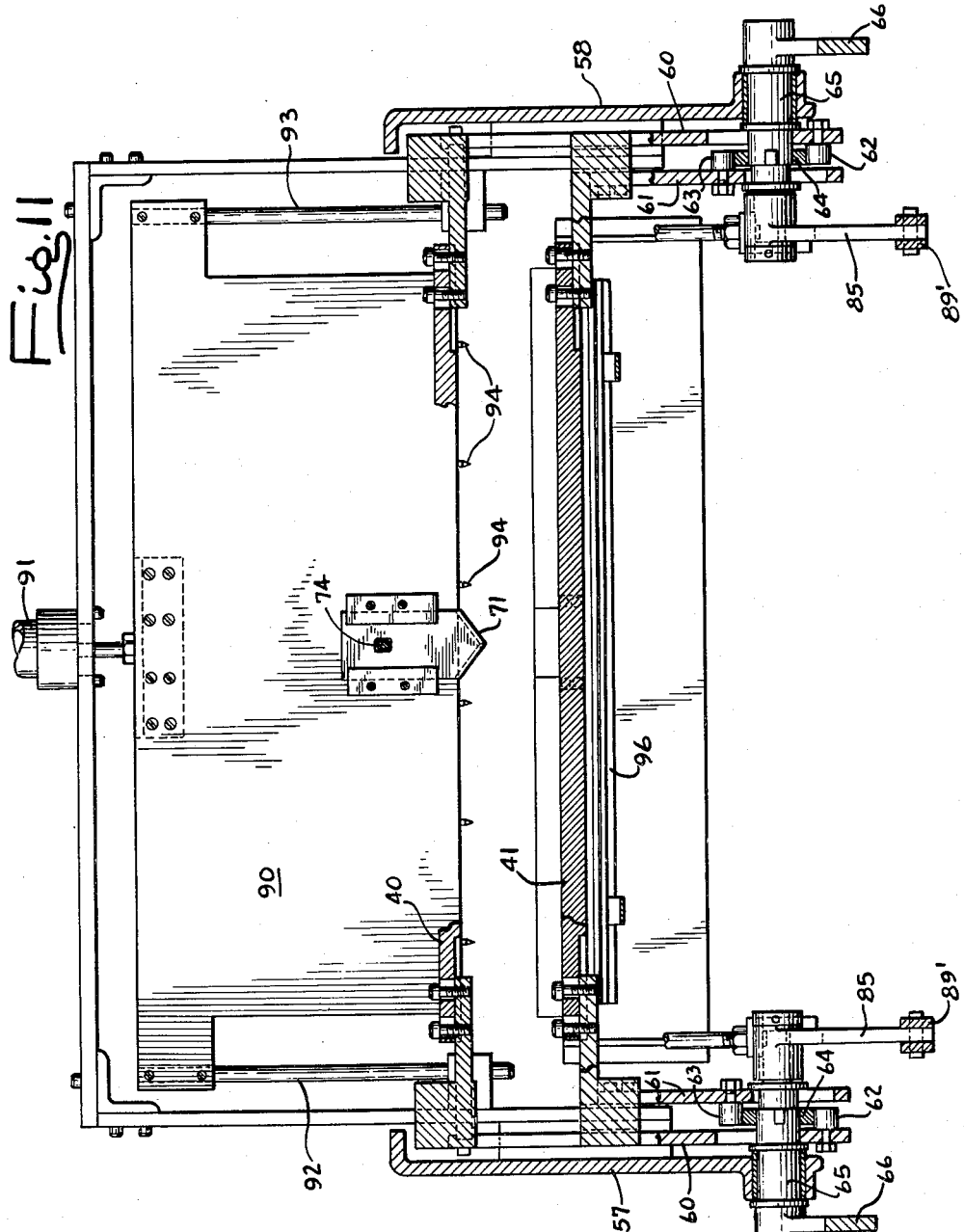

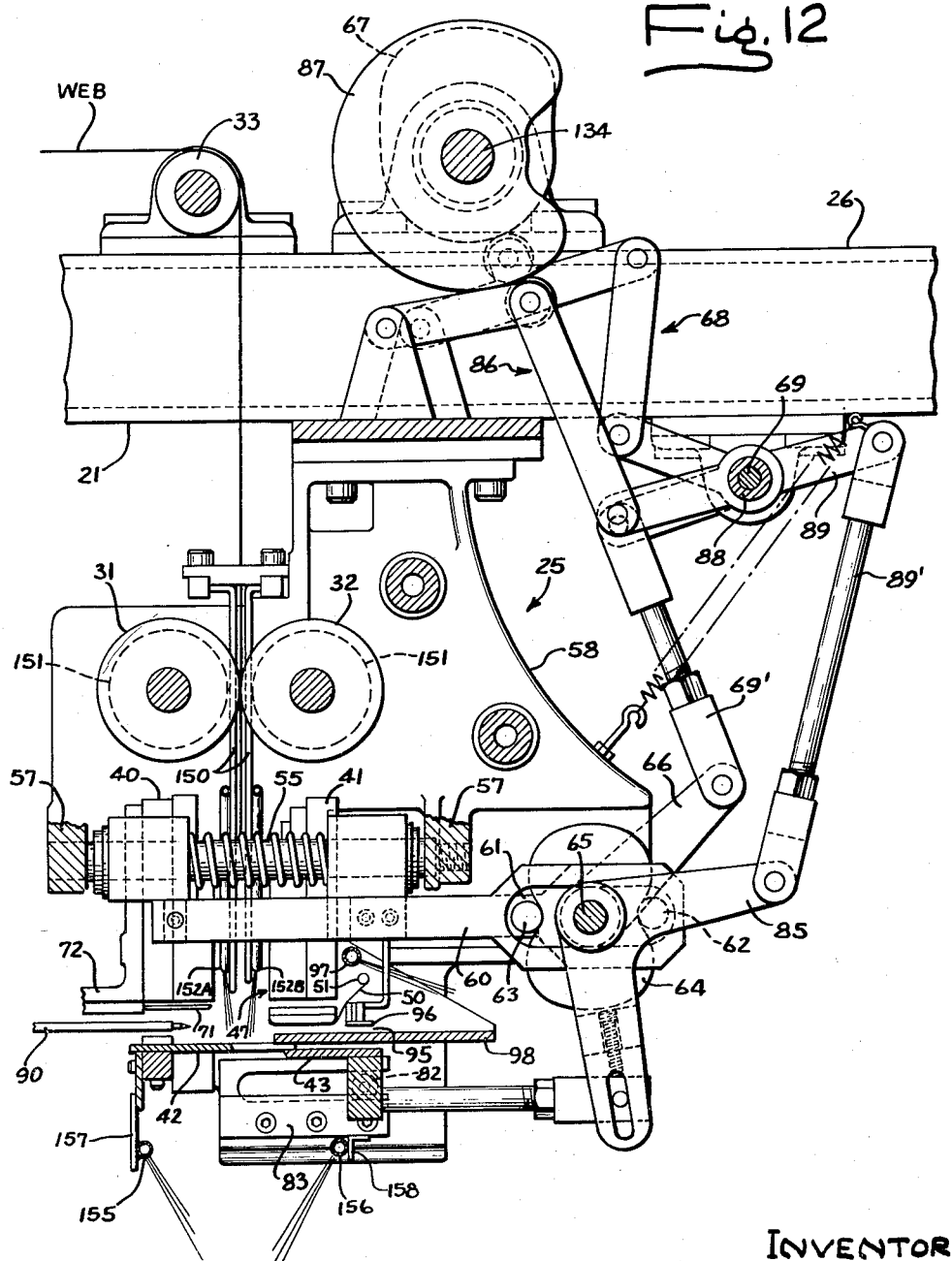

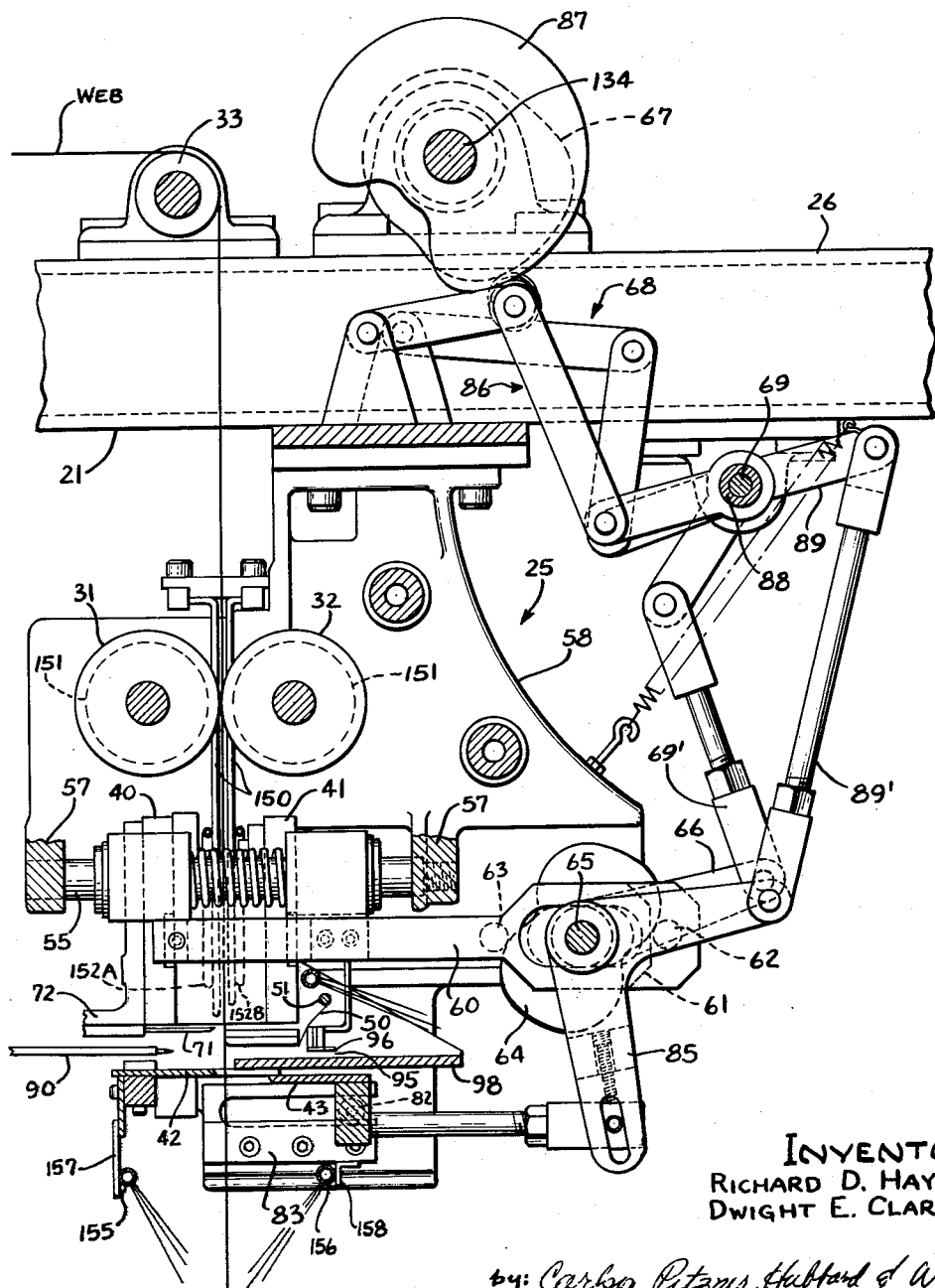

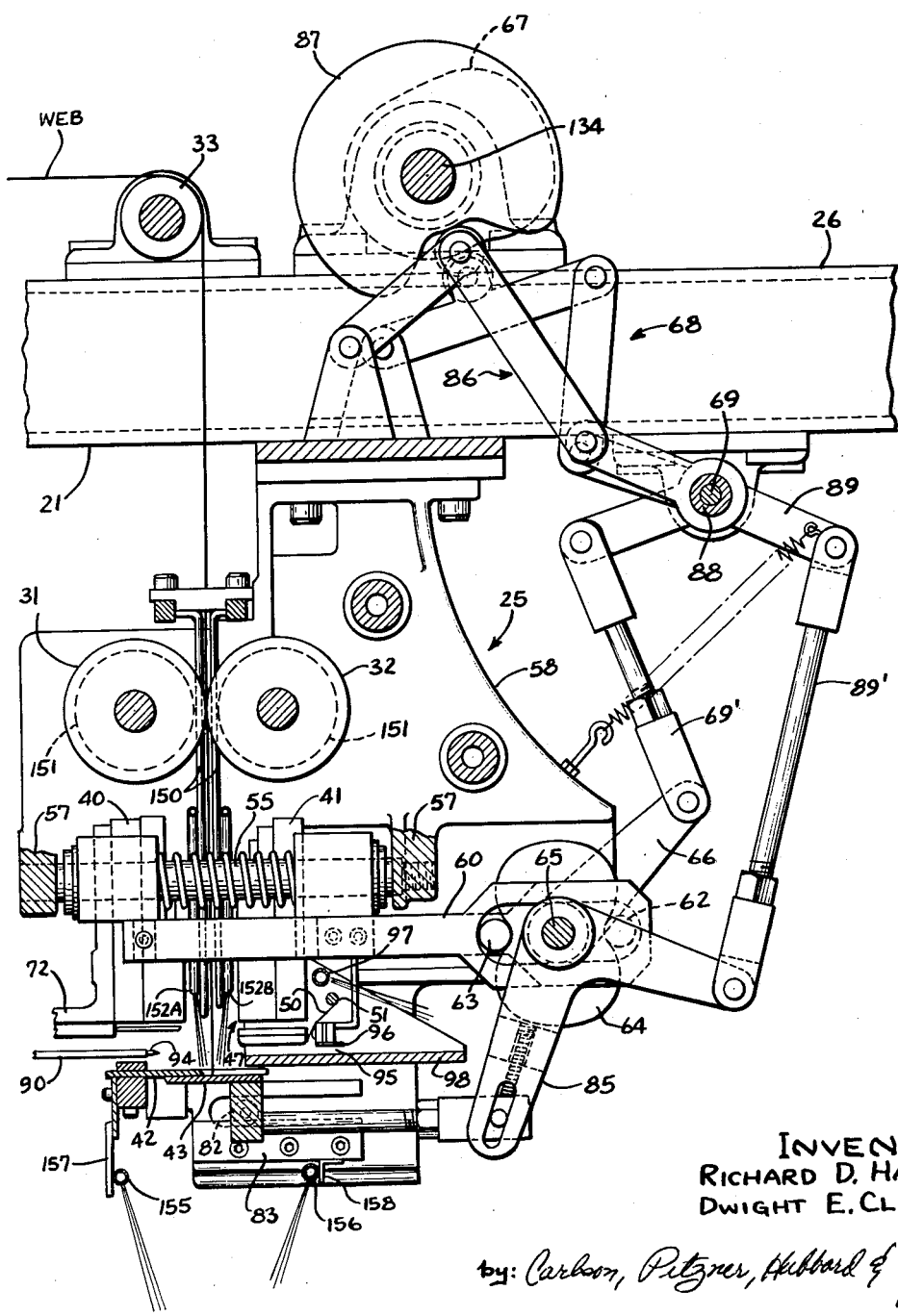

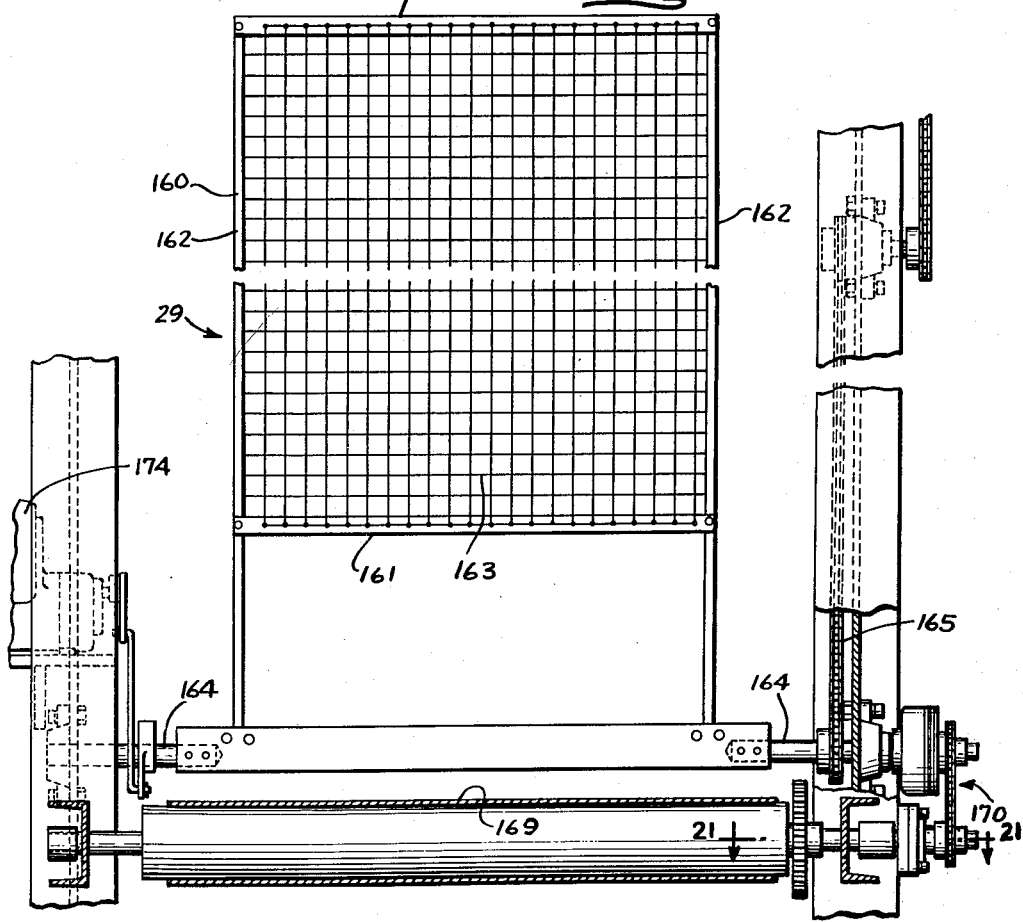

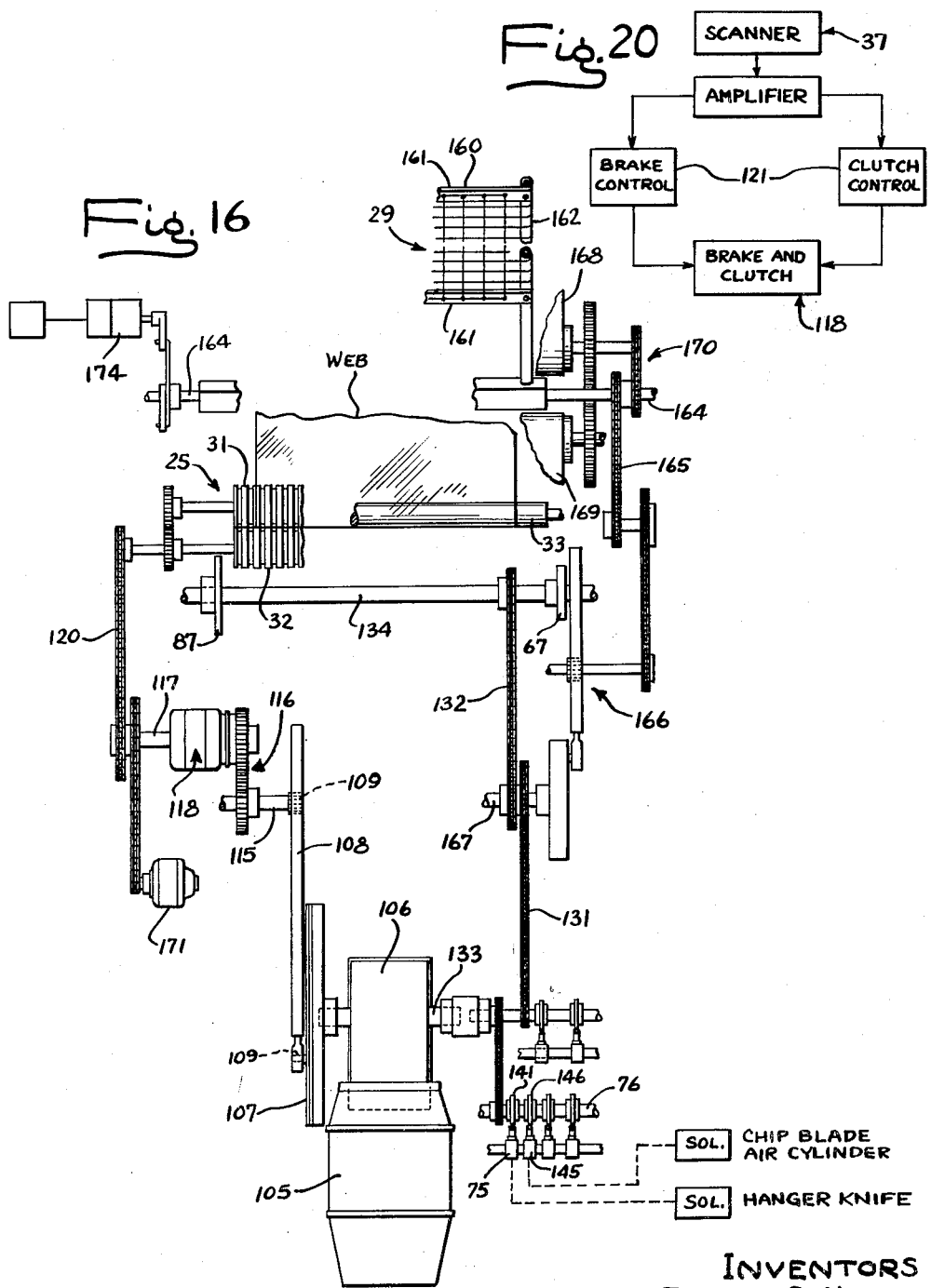

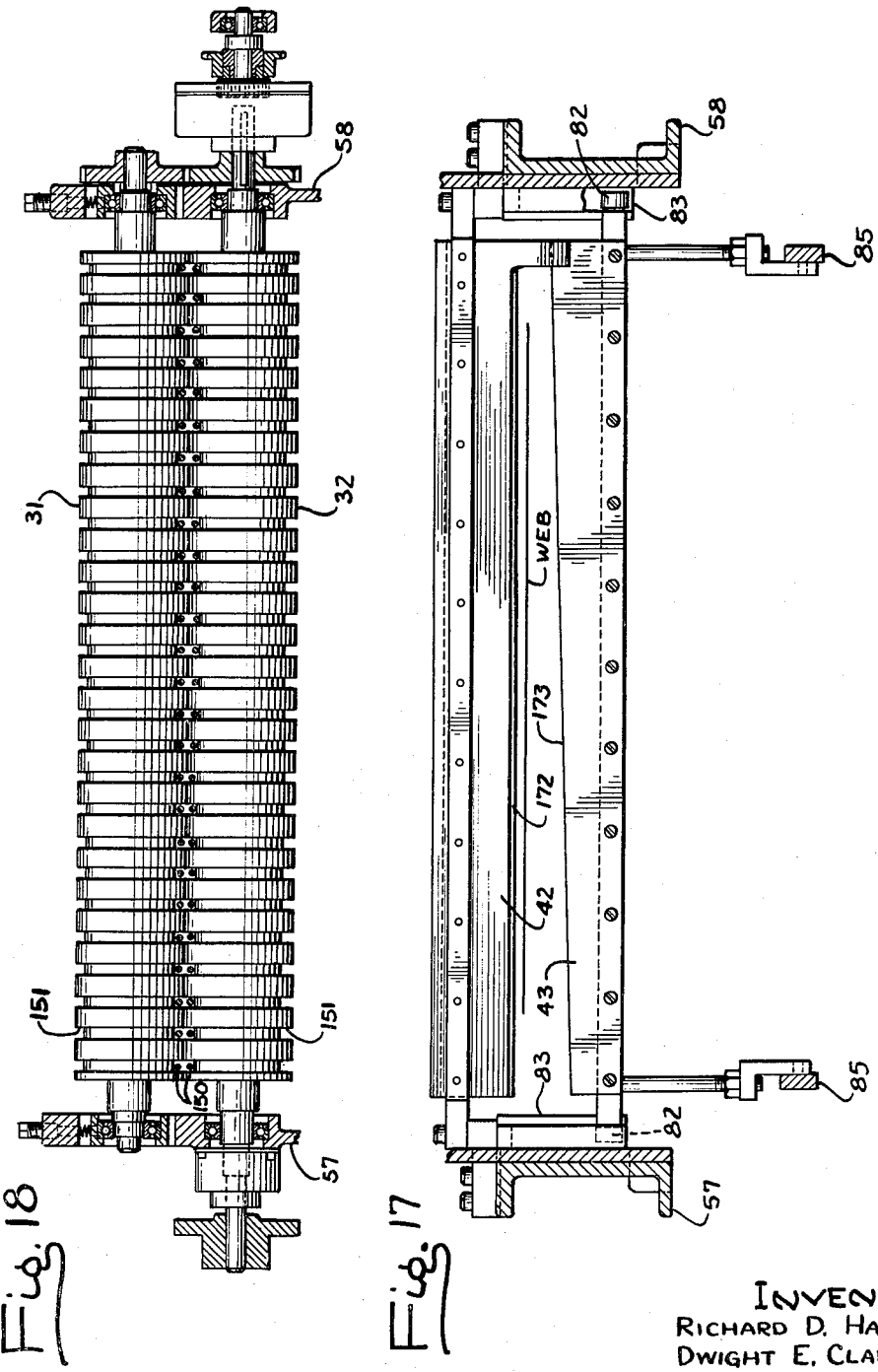

United States Patent Office 3,008,865
Patented Nov. 14, 1961

3,008,865
METHOD AND APPARATUS FOR
MAKING BAGS
Richard D. Hayes, Pittsford, and Dwight E. Clark,
Canandaigua, N.Y., assignors, by mesne assignments,
to National Distillers and Chemical Corporation, a
corporation of Virginia
Filed June 25, 1957, Ser. No. 667,771
19 Claims. (Cl. 156—510)

This invention relates to bag making, and more particularly to a method and a machine for making contour or slope-shouldered garment bags from relatively flexible heat-sealable material such as polyethylene film.

Such bags are used by retail cleaning establishments and laundries and are commonly called "pull-over" garment bags due to the manner in which they are pulled down over a garment to place the garment in the bag.

It is a general aim of this invention to provide a method of making a garment bag of this type whereby the bags are manufactured at a very high production rate. It is a related aim of this invention to provide an improved bag making machine in which this method may be carried out.

More specifically, it is an object to provide a machine which receives a continuous flattened, gusseted tube of bag stock such as polyethylene film fed at high speed directly from an extruder or from a supply roll, and by means of heat sealing and material severing mechanisms forms transverse seams in the web at spaced intervals, and severs the web between the seams so formed to make finished bags.

Heretofore, exclusively mechanical systems for guiding and feeding a web of bag stock through the mechanisms of a bag making machine, and particularly in arrangements where the bag is made while the web is moving horizontally, have had inherent disadvantages. Difficulties arise due to many causes, among these being the difficulty in grasping a web of relatively thin material for moving it in a precise manner; friction resisting rapid passage of the web through the mechanisms; lack of tautness in the web resulting from the inadequate support for the web during the bag making operations; and interference with the flow of the web following severing or heat sealing operations due to the web sticking to the mechanisms or catching in parts of the machine.

Therefore, it is an object of this invention to overcome such disadvantages by carrying out the bag making operations in the machine while the web is guided and supported in a vertical path. A related object is to provide a combined mechanical and air feed system for advancing and guiding the web through the bag making mechanisms of the machine and for supporting the web during the bag making operations. Due to the flexibility, fragility and limpness of polyethylene film, a major problem is experienced in feeding such material through the machine at the required high rate for production, as well as in supporting the material while the various operations involved in making the bags are carried out. By using the feed system of this invention it is possible to maintain a higher production rate of finished bags for longer maintenance-free periods. The reduction in down time and uniformity of product results in reduced production costs.

A further object is to provide apparatus for stacking bags as they are made in the machine which is effective to stack the output of the machine in an orderly, efficient manner.

Further objects will appear from the following description taken in connection with the accompanying drawings, wherein:

FIGURE 1 is a perspective view of a finished gusseted garment bag constructed by use of the machine and in accordance with the method of this invention;

FIG. 2 is a horizontal sectional view of the bag taken in the plane of lines 2—2 of FIGURE 1;

FIG. 3 is a diagrammatic view showing the path of the material through the machine in making bags;

FIG. 4 is a view in side elevation of the bag making machine;

FIG. 5 is a top plan view of the bag making machine;

FIG. 6 is a view in elevation of the machine head and is taken substantially in the plane of lines 6—6 of FIG. 4;

FIG. 7 is a transverse vertical sectional view of the machine head taken substantially in the plane of lines 7—7 of FIG. 6;

FIG. 7a is an enlarged detail view of an air manifold tube and is taken substantially in the plane of lines 7a—7a of FIG. 6;

FIG. 8 is a vertical sectional view showing the machine head and is taken substantially in the plane of lines 8—8 of FIG. 7;

FIG. 8a is a view in elevation of the film chip;

FIG. 8b is an enlarged sectional view taken through an air manifold tube substantially in the plane of lines 8b—8b of FIG. 8;

FIG. 9 is a vertical sectional view showing the machine head and is taken substantially in the plane of lines 9—9 of FIG. 7;

FIG. 10 is a horizontal sectional view showing the machine head and is taken substantially in the plane of lines 10—10 of FIG. 7;

FIG. 11 is a horizontal sectional view showing the machine head and is taken substantially in the plane of lines 11—11 of FIG. 7;

FIG. 12 is a stop motion view showing the drive for the machine head platens and the web cut-off knives, and is taken substantially in the plane of lines 12—12 of FIG. 6;

FIG. 13 is a view like FIG. 12 showing the machine head platens operated at closed position;

FIG. 14 is a view like FIG. 12 showing the machine head platens opening and the web cut-off knives following the completion of a web severing operation;

FIG. 15 is a transverse vertical sectional view showing the fly stacker apparatus taken substantially in the plane of lines 15—15 of FIG. 4;

FIG. 16 is an enlarged plan view of the drive for the machine parts shown schematically;

FIG. 17 is a horizontal sectional view showing the cut-off knives and is taken substantially in the plane of lines 17—17 of FIG. 7;

FIG. 18 is a horizontal sectional view showing the draw rolls and is taken substantially in the plane of lines 18—18 of FIG. 7;

FIG. 19 is an enlarged fragmentary sectional view showing the platens together;

FIG. 20 is a schematic diagram of the brake and clutch control circuit; and

FIG. 21 is a fragmentary horizontal sectional view showing the drive for the conveyors.

While the invention is susceptible of various modifications and alternative constructions, a preferred embodiment thereof has been shown in the drawings and will be described below in detail. It should be understood, however, that there is no intention to limit the invention to the specific form disclosed, but, on the contrary, the invention is to cover all modifications, alternative constructions and equivalents falling within the spirit and scope of the invention as expressed in the appended claims.

GENERAL MACHINE ORGANIZATION

Figure 4:
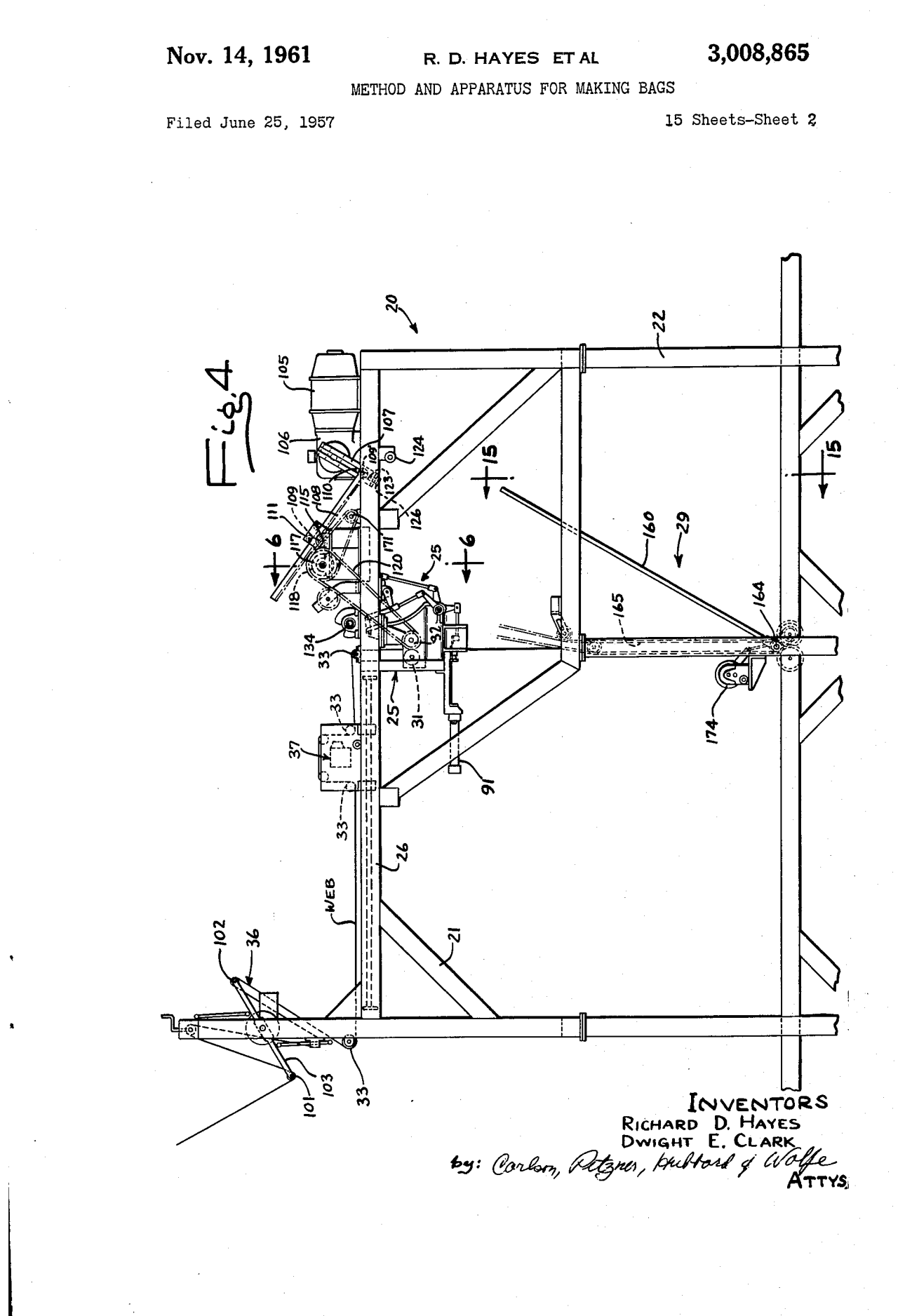

Turning now to the drawings, and particularly to FIGURES 1-4, the bag making machine 20 includes a framing structure divided into an upper section 21 and a lower section 22. A web of bag stock (FIGS. 2, 3) is drawn continuously into the machine from a supply roll or directly from an extruder and enters the machine at the upper left-hand side of the machine as viewed in FIG. 4, at the forward end of the machine.

In accordance with the invention, the web is drawn over a series of rollers into a vertical path and fed downwardly into a machine head having heat sealing and material severing elements for forming downwardly converging seams defining the neck of the bags and for cutting the material into finished bags. In the exemplary form of the invention illustrated, referring particularly to FIGS. 3 and 4, the machine head 25 is positioned substantially centrally of the machine and just beneath the upper horizontal rails 26 of the machine frame structure. The bags emerge from the head inverted, with the contour sealed end or neck 27 (FIG. 1) of the bag hanging down. The finished bag is then severed from the web leaving the bottom 28 of the bag open. At the instant of delivery, in keeping with the invention, a fly stacker 29 takes the bag and lays it flat on a receiving platform.

The web moves intermittently through the machine head so that the heat sealing and severing operations may be carried out while the web is stopped. For moving the web through the machine, draw rolls 31, 32 are used which are positioned above the machine head and deliver the web to it. Referring to FIGS. 3-5, it will be seen that the horizontal top rails 26 of the upper section 21 of the machine support guide rollers 33 over which the web is trained as it is led from a dancer roll assembly 36 at the receiving end of the machine to the draw rolls. The web during this period of travel also passes over an electric eye scanner 37 which through a control to be later described, synchronizes the operation of the machine head 25 with printed matter which has been previously placed on the web.

MACHINE HEAD

Material heat sealing

Turning now to the machine head 25 in greater detail, referring to FIG. 7, it will be seen to comprise a pair of cooperating, horizontally movable platens 40, 41 between which the web passes and which close together to clamp the web, and a pair of cooperating shear knives 42, 43 operated in timed sequence with the platens for cutting off the bags. For forming downwardly converging seams in the bag stock, defining the neck of the bags, the forward platen 40 (FIG. 9) carries a heat-sealing element comprised of elongated metal bars 44A, B arranged in a flat V-shape with the point of the V directed downward, and below these bars are heat sealing plates 45A, B which are arranged to engage the web when the platens are brought together. In addition, the bars 44A, B have a core 46 for a heating element which is suitably connected by a lead to a current source. For backing up the material when the platens are brought together the rear platen 41 (FIGS. 7, 8) bears a pad 47 against which the heat-sealing bars 44A, B press. As shown in these figures the pad is formed by members 48A, B arranged also in flat V shape, and covered with a glass cloth 50 impregnated with a non-tacky substance such as Teflon to reduce friction, which is stretched over the members 48A, B and under the edge of the rear platen and fastened to a bar 51. Under the cloth 50 a resilient insert 50' is mounted to be engaged by the heat sealing plates 45A, B. Thus, the bag stock is clamped between the platens to form the converging seams, the heat-sealing plates also functioning in this preferred embodiment of the invention as a hot knife-cut-off by melting the material along the edges of the seams. For mounting purposes the platens are slidably supported and guided on spaced guide rods 55, 56 securely fastened to the end plates or brackets 57, 58 of the machine head. These end plates are rigidly fastened to the upper section 21 of the machine frame (FIG. 8).

For purposes of actuating the platens (FIGS. 7, 12-14) at each side of the head a pull rod 60 and a push rod 61 are fastened respectively to the forward and rear platens 40, 41. Furthermore, similar drives are provided at each side of the head for these rods. In the present instance the push and pull rods are moved by rollers 62, 63 following a double-acting cam 64 carried on the shaft 65 which mounts the drive end of both the push and pull rods. Appropriate motion is imparted to each double-acting cam by a drive terminating in a crank 66. This drive in both cases includes the drive cam 67 on the top of the frame, a toggle linkage 68 driving through the shaft 69, and the link 69' connected to the crank 66 and the shaft 65 on which is keyed the double-acting cam 64.

Hanger slot knife

In order to form a hanger opening 70 (FIG. 1) in the neck of the bag, in the region of the material where the seams defining the contour shape converge, a hanger slot knife 71 is used (FIGS. 7, 10, 11). This knife 71 is supported below a bracket 72 extending in front of the forward machine head platen 40 to a slide horizontally relative to the forward platen and is a sharp V blade which forms a straight cut in the film approximately two inches in length for an ordinary bag. A solenoid 73 also supported on the bracket 72 is used for actuation of the hanger knife, motion of the solenoid plunger being transmitted to the knife by a bell crank lever 74. The solenoid 73 is actuated by a circuit including a cam operated microswitch 75 positioned on a microswitch shaft 76 rotatably mounted above the upper frame section 21.

Web severing

Severing the web transversely so as to form finished bags, which severance forms the open bottom 28 of the bag and releases the bag so it may be taken and stacked, is performed by the pair of cut-off or shear knives 42, 43 (FIGS. 7, 12-14, 17) which are mounted on the machine head 25 a short distance, herein shown as substantially less than the full length of a finished bag, vertically below the platens. In the present instance, one of these knives (42) is fixed to the forward platen 40. However, the second knife 43 is mounted for movement on rollers 82 (FIGS. 8, 17) along horizontal slides formed in slide bars 83 fastened to the end brackets 57, 58 of the machine head. Such movement is imparted to the movable shear knife 43 by spaced bell cranks 85 which are pivotably mounted on the horizontal stub shafts 65 supporting the drive ends of the actuating rods for the platens. A drive linkage is provided at each side of the head, from the drive cams 87 for the knives (FIG. 6). This linkage in both cases includes a toggle linkage follower 86 which drives through a sleeve 88 and the crank 89 and link 89' connected to the bell crank 85.

Chip ejection and disposal

Due to the contour shape of the top of the bag, substantially triangularly shaped pieces of scrap stock (FIG. 8a) joined by a narrow connecting strip remain between the square edge defined by the cut-off shear knives and the edges of the seams severed by the heat-sealing elements. For removing this chip, a chip ejector blade 90 is used (FIGS. 7-14), actuated by an air piston 91 in the present instance. This blade is supported for horizontal reciprocatory movement relative to the platens by guide rods 92, 93, and engages the chip to move it laterally out of the machine head for disposal purposes, and then returns. A plurality of spaced, pointed prongs 94 (FIG. 11) on the front edge of the blade 90 puncture the chip and carry it through a film chip aperture 95 in the rear platen 41 past a stripper 96 which functions to strip the chip from the blade 90 upon return movement of the ejector blade and completion of the cycle.

While the chip ejector blade 90 is used for clearing the chip from the machine head 25, for conveying the chip to a suitable retainer, high pressure air is used. In the present instance, streams of air are derived from a chip ejector manifold 97 and directed to assist in stripping the chip from the blade and moving it to a collector chute or screen (not shown) which may be mounted at the end of the chip guide tray 98 positioned behind the rear platen. Herein the manifold 97 (FIG. 7) is fastened to the rear platen 41 just above the guide aperture 95 through which the chip is forced by the ejector blade 90 so that the film chip is acted upon directly by the air streams after having been conveyed through the aperture by the blade.

MATERIAL FEEDING APPARATUS

In accordance with the present invention, the web of bag stock is positively drawn into the machine by mechanical means, and is moved through the machine to the stacking apparatus for the finished bags, and supported during the bag making operations by an air feed system.

Due to the fragility and limpness characterizing certain types of plastic film which may be made into bags by this machine, for example polyethylene film of a thickness approximating 0.5 mil., substantial problems are encountered in supporting the film for the heat sealing and severing operations and in guiding and feeding the film through the various mechanisms. In the machine illustrated, at a production rate of up to 200 finished bags per minute, the film is maintained in alinement during processing, and the finished bags are taken as they emerge from the machine and stacked in an orderly, efficient manner.

As depicted diagrammatically in FIG. 3, the web is drawn into the machine passing over a dancer roll assembly 36 at the forward end of the machine and over the scanner assembly 37.

Introduction of web to machine head

For drawing the web into the machine and up to point of entrance into the machine head 25, grooved draw rolls 31, 32 of resilient material such as rubber are used (FIGS. 7–9), the peripheral contact between the rolls caused by compression springs providing means for applying proper tension to feed the web evenly through the machine at the required speed. These draw rolls 31, 32 are supported in bearings mounted by means of the spaced end brackets 57, 58 bolted to the framing members of the upper frame section 21. The dancer assembly 36 is comprised of two idler rolls 101, 102 (FIG. 4) mounted at the ends of parallel, pivotally supported arms 103. The motion of the web through the machine head 25 is intermittent in order that the heat sealing and cut-off operations may be carried out in the machine head on the web while the web is stopped. The web from a continuous, even supply as it is received, is taken up and fed out in an intermittent movement by the dancer roll assembly 36. For driving the grooved draw rolls 31, 32 intermittently in a direction to draw the web into the machine, a drive is employed (FIGS. 4, 5, 16) including a variable speed motor 105 and gear reducer 106, a crank 107, and a rack 108 and pinion 109 driven from the crank 107 whereby reciprocatory motion is imparted to the pinion 109. The rack 108 is mounted at the drive end on a fulcrum pin 109' fastened to a block 110 slidably mounted in the crank arm casting. At the pinion, the rack is slidably mounted between brackets 111 which support rollers 112 which engage the rack and apply pressure to maintain the rack and pinion teeth in driving engagement with load conditions.

Reciprocatory motion of the pinion shaft 115 is transmitted through gears 116 to an intermediate shaft 117 on which means are mounted for translating the reciprocatory motion to intermittent uni-directional motion. In the present exemplary illustration of the invention, this means comprises an electric clutch and brake 118, for example, a Warner clutch brake size 500, actuated through the use of the scanner assembly 37 and appropriate microswitches and cams. It will be understood by a man skilled in the art that equivalent arrangements such as an ordinary overrunning clutch may be substituted to obtain this same result. Herein by means of such control instrumentalities the clutch is engaged during a forward stroke of the rack and the brake engaged during the return stroke. This causes the intermediate shaft 117 to rotate in one direction as the rack 108 moves forward, and to remain stationary as the rack returns. It will be understood that during the periods that the intermediate shaft 117 remains stationary, the mechanisms of the machine head 25 operate to seal the bag and sever the material so that the finished bag is cut off and delivered to the stacking apparatus. For transmitting the intermittent uni-directional motion to the web, a sprocket drive 120 is employed for connecting the intermediate drive shaft 117 and the draw rolls 31, 32. By means of the scanner assembly 37 which registers upon an eye mark on the film, and a brake and clutch control 121 shown schematically in FIG. 20 as connected to the scanner, the operation of the brake-clutch 118 is synchronized with the print location on the film. Thusly, printed matter previously placed on the continuous web of bag stock appears properly located on the finished bags.

For adjusting the length of bags made on the machine, means are provided for controlling the number of revolutions of the draw rolls 31, 32 per cycle of the intermittent motion deriving mechanism, and thus the length of film drawn by the rolls per cycle. As shown in FIG. 4, for this purpose means are provided for varying the stroke of the crank 107 by an adjustable screw 123 which moves the block 110 slidably mounted in the crank arm casting. This block 110 supports the fulcrum pin 109' on which the drive end of the rack 108 is pivoted. For adjusting the stroke of the crank 107 while the machine is operating, a control rod terminating in a readily accessible knob 124 is provided for manipulating the adjustable screw as by moving a pin carried by the control rod into position to be contacted by a toothed wheel 126 on the screw as the crank arm rotates.

Action of platens

For the purpose of actuating the platens 40, 41 and for operating the shear knives 80, 81 for severing the film in timed sequence with the intermittent motion of the draw rolls 31, 32 feeding the film into the machine head 25, a drive 130 (FIGS. 5, 16) is provided from the same source of power, namely the main drive motor 105 and gear reducer 106. This drive for the platens and severing mechanism includes tandem sprocket drives 131, 132 which couple the output shaft 133 of the gear reducer with a cam shaft 134 which bears cams 67, 87 (FIGS. 5, 12–14) for actuating in the proper timed sequence the platens 40, 41 and the shear knives 42, 43 of the severing mechanism. Linkages connect these cams 67, 87 respectively to the drive cam 64 for the platens and the bell crank lever 85 which operates the rear shear knife 43.

In the operation of the machine in making bags, the platens 40, 41 of the machine head 25 begin to close immediately upon, or slightly before the draw rolls 31, 32 have finished feeding the web of bag stock. It will be evident that very precise adjustment of this timing may be had in order to obtain optimum machine performance by adjustment of the relative angular position of the drive cams 67 for the platens. After the platens of the machine head 25 have closed, the hanger slot knife 71 is actuated by means of the solenoid actuator 73 therefor. This solenoid is energized by a circuit including a microswitch 75 (FIG. 16) controlled by one (141) of the bank of cams on the primary cam shaft 76. Since this cam shaft 76 is driven in synchronism with the drive for the draw rolls 31, 32, correct timing is assured, however adjustments in timing may be made by adjusting the control cam 141. At the instant of actuation of the hanger slot knife 71, the shear knives 42, 43 of the severing mechanism have begun to sever the web. As the shear knives complete the cut, the platens 40, 41 of the machine head move apart, the hanger slot knife 71 is returned by a return spring, and the draw rolls 31, 32 again begin to turn, feeding the material for the next bag vertically down through the head 25. Likewise, the timing of the cut-off knives 42, 43 may be changed by adjusting the drive cams 87 (FIGS. 12–14).

Chip removal

For the purpose of removing the chip of bag stock remaining after the shear knives 42, 43 have completed the severing operation, the chip ejector blade 90 moves across the machine head to convey the chip towards the retainer screen. Motion is imparted to the chip ejector blade in the present instance by an air piston 91 which is actuated by a control circuit including a switch 145 controlled by another (146) of the bank of cams on the primary cam shaft 76. The timing of the reciprocatory motion of the chip ejector blade 90 preferably is such that the blade returns to its initial position before the neck of the next bag is fed to a point of interference with the blade.

Mechanical and air feeding of web.

In keeping with the present invention, a combined mechanical and air feed is used for guiding the web into the machine head 25, conveying the web through the head which involves stripping the bag stock from the heat-sealing bars, and moving the limp, flimsy material vertically downwardly so that it is suspended evenly from the machine to be taken by the stacking mechanism.

For delivering the web into the machine head from the draw rolls 31, 32 a mechanical guide to the flow of the film is provided by a gate (FIGS. 3, 7–9) into which the film is fed by the draw rolls. Herein this is comprised of sets of spaced wire fingers 150 which are positioned between the draw rolls, being located in the grooves 151 provided therein for this purpose. Assistance to the flow of the material into the machine head 25 is supplied by air fingers (FIGS. 3, 7) formed by jets or streams of air under pressure which are directed alongside the mechanical wire fingers against the web. Thus these jets or streams of air are directed from both sides of the gate in a downward direction and converging towards the web. In the present instance, air for this purpose is conveyed to the gate by a pair of hollow tubes 152A, D, which are generally horizontally disposed below the draw rolls and above the machine head, being mounted to the wire fingers. A series of spaced bored holes 153 (FIG. 8a) located adjacent the wire fingers and angled so as to obtain the desired air flow, are provided in each tube 152A, B. This high pressure air also functions to assist in stripping the web from the sealing bars 44A–B, 48A–B, of the platens 40, 41 following completion of the heat sealing operation due to the direction and force of the streams of air and the close spacing of the pressure air source above the platens.

After the completion of a heat-sealing operation, the platens 40, 41 open to allow the sealed neck of the partially made bag to be fed vertically downwardly so that the continuous web may be severed by the shear blades 42, 43 into bag lengths to form the finished bags. In order to deliver the web downwardly into the free, open space below the head 25, air manifolds 155, 156 (FIGS. 3, 7) mounted on the opposite sides of the path of the web are used for directing currents defining an air gate directly below the machine head 25. The currents of air from the manifolds merge below the head allowing the web to remain flat as it moves vertically downwardly and to hang suspended during the period of operation of the machine head. Considerable air turbulence is created in the lower section of the machine frame below the head during the operation of the machine, and in the present case particularly by reason of the construction of the fly stacker which will be described hereinafter. This air turbulence is counteracted by the currents of air directed from the air manifolds forming this air gate, so that the web flows evenly and smoothly to the stacker. Furthermore, because the sealed end of the web is down, air is not picked up to balloon the tube.

Referring to FIG. 7, as shown the air manifolds 155, 156 comprise parallel tubes mounted by means of brackets 157, 158 to the platens, below the machine head on each side of the path of the web. Spaced openings directing air downwardly and angled so that the currents of air merge serve to control the air flow in the manner desired. Air under pressure is supplied to the manifolds by service lines.

Fly stacker

For receiving the finished bags as they emerge from the machine head 25 in a flat condition and lying substantially in a vertical plane, in carrying out the invention an oscillatable fly stacker 29 is provided which is operated in time with the delivery of the bags so that the stacker takes the bags in the vertical position and lays them flat alternately upon opposite horizontal platforms. The bag hangs poised after being severed, and is supported flat and on an even keel by the air feed system, and is then taken by the fly stacker.

Referring particularly to FIGS. 3, 4, 15, the fly stacker 29 as there shown includes an open, substantially rectangular screen 160 made up of parallel bars 161 of light but strong material, for example, aluminum, with end members 162 securing the bars together preferably made of Fiberglas tubing. The open framing making up the screen is covered by a large, mesh netting 163 like tennis netting. For mounting and drive purposes, the screen 160 is supported by a shaft 164 which is carried in suitably positioned bearings in the machine frame. This shaft is positioned substantially in the plane of delivery of the bags. A drive 165 connected to this mounting shaft supplies oscillatory motion to drive the shaft in a manner that causes the stacker screen 160 to move between opposite horizontal positions (FIG. 3) through a vertical position where the finished bag is taken upon delivery against the screen on both forward and return strokes. Oscillatory motion for driving the fly stacker screen is obtained from a rack and pinion reciprocatory motion deriving mechanism 166 (FIGS. 5, 16) located on the upper frame section 21, and driven in synchronism with the elements of the machine head 25, from the main drive motor 105 through the output shaft 133 of the gear reducer 106, the first sprocket drive 131, and the secondary drive shaft 167. This reciprocatory motion deriving mechanism 166 is like the similar mechanism including the rack 108 and pinion 109 used in the drive for the draw rolls 31, 32. While different receiving arrangements for the finished bags may be employed, in the present instance, horizontal platforms are provided by conveyors 168, 169 which are operated in timed sequence with the stacker screen 160 by means of a sprocket drive 170 which connects the mounting shaft 164 of the screen and the conveyor shafts, respectively.

SUMMARY OF OPERATION

While the operation of the machine in making finished bags will be evident from the preceding description, referring to the schematic view, FIG. 3, showing the path of the web through the machine, and FIG. 16 showing the drive, a complete cycle of operation will be described.

To start up the machine, the machine control (not shown) is energized causing the heat-seal elements 44A, B to heat up (connections not shown) and air to be supplied to the air manifolds of the air feed system. The bag stock, for example, polyethylene film, is then manually threaded through the dancer roll assembly 36 and into the draw rolls 31, 32. The machine is preferably started with the stacker screen 160 in the down position, and thus with the machine head platens (FIG. 12) 40, 41 and cut-off knives 42, 43 open. By the use of an auxiliary air motor 171, the draw rolls 31, 32 are operated without the platens 40, 41 being operated so that the web is drawn freely through the machine head 25. For satisfactory operation the web should be wrinkle free and with a slight tension existing between the dancer roll assembly 36 and the draw rolls 31, 32. Once adjustments have been made to obtain proper web flow, then the main drive may be started, to operate the machine head 25 and stacking apparatus 29.

A full cycle of operation begins with the draw rolls 31, 32 stopping and the platens 40, 41 of the machine head 25 closing together (FIGS. 12, 13) to clamp the web and form the downwardly converging seams defining the neck of the bag (FIG. 1). During this period the dancer roll assembly 36 takes up the momentary slack and maintains tension in the web as it is fed continuously from the extruder or supply roll. As the platens 40, 41 come together, the hanger slot blade 71 is actuated to form the slot 70 for the clothes hanger. During this operation the heat seal bars 44A, B and pad 47A, B carried by the forward and rear platens 40, 41 respectively, give added support for the web so that the hanger slot blade 71 upon actuating forms a clean cut in the film.

Likewise, as the platens 40, 41 come together, the cut-off knives 42, 43 for severing the web are operated. Due to the angular relation of the shearing edges 172, 173, the severing begins at one side of the web (FIG. 17) and moves across the width of the web. With proper timing these cut-off knives 42, 43 commence to cut just prior to the instant the hanger slot knife 71 is actuated. This action whereby the cut-off knives shear the web, also lends support to the material so that the hanger slot knife 71 can pierce and form a clean cut.

The heat sealing elements borne by the platens operate to form the required seams and also as a hot knife cut-off, to sever the web along the edges of the seams. The chip which remains between the converging seams and the square cut-off is cleared from the machine head 25 by the chip ejector blade 90. This blade is operated when the cut-off knives 42, 43 have completed the severing operation. Moreover, at the completion of the cut-off operation, the platens 40, 41 of the machine head 25 open to release the web and the draw rolls 31, 32 begin again to feed.

The severing operation performed by the cut-off knives 42, 43 separates the finished bags from the continuous web. These finished bags are taken at the instant the material is severed, by the fly stacker screen 160, and placed on platforms formed by conveyors 168, 169 positioned for that purpose. The operation of the fly stacker 29 is such that the finished bags are received on both the forward and return strokes, and a counter 174 operated from the mounting shaft 164 for the stacker screen 160 is effective to count out the finished bags.

We claim:

1. In a bag making machine for making successive bags from a continuous web of flattened tubular heat-sealable material, the combination comprising, means for advancing the material downwardly in a substantially vertical path, a pair of platens mounted respectively on each side of the path of the material, heat-seal elements carried by said platens for forming seams defining one end of the bags, means for moving said platens together for clamping the material and engaging the heat-seal elements, cooperating shear knives mounted to engage the material just below the seam, and means for operating said shear knives in timed sequence with the movement of said platens so as to sever the material while said platens clamp the material therebetween to form the other end of the finished bags.

2. In a bag making machine for making bags from flattened tubular heat-sealable material, the combination comprising, means for advancing the material downwardly in a substantially vertical path, a pair of platens mounted respectively on each side of the path of the material, heat-seal elements carried by said platens for forming seams defining the neck of the bags, means for moving said platens together for clamping the material and engaging the heat-seal elements, a hanger slot knife carried by one of said platens for cutting a relatively short hanger slot in the material, cooperating shear knives for severing the material and forming the bottom of the bags, and means for operating said hanger slot knife and said shear knives in timed sequence with the movement of said platens so as to sever the material while said platens clamp the material therebetween.

3. In a bag making machine for making bags from flattened tubular heat-sealable material, the combination comprising, means for advancing the material downwardly in a substantially vertical path, a pair of platens mounted respectively on each side of the path of the material, heat-seal elements carried by said platens for forming downwardly converging seams defining the neck of the bags, means for moving said platens together for clamping the material and engaging the heat-seal elements, co-operating shear knives mounted below said platens for relative horizontal movement and forming the bottom of the finished bags, and means for operating said shear knives while said platens clamp the material therebetween so as to simultaneously cut off one bag and form the neck of the succeeding bag.

4. In a bag making machine for making bags from flattened tubular heat-sealable material, the combination comprising, means for drawing the material downwardly into a substantially vertical path, a pair of cooperating platens mounted respectively on each side of the path of the material, heat-seal elements carried by said platens for forming downwardly converging seams defining the neck of the bags, means for moving said platens together for clamping the material and engaging the seal elements, a hanger slot knife carried by one of said platens for cutting a relatively short hanger slot in the material, said knife being arranged to move horizontally into cutting engagement with said material in the region of the material where the seams converge, a shear knife fixed to one of said platens, and a cooperating shear knife mounted for horizontal movement relative to said fixed knife for severing the material into finished bags.

5. In a bag making machine for making bags from flattened tubular heat-sealable material, the combination comprising, means for drawing the material downwardly into a substantially vertical path, a pair of cooperating platens mounted respectively on each side of the path of the material, heat-seal elements carried by said platens for forming downwardly converging seams defining the neck of the bags, means for moving said platens together for clamping the material and engaging the seal elements, a hanger slot knife carried by one of said platens for cutting a relatively short hanger slot in the material, said knife being arranged to move horizontally into cutting engagement with said material in the region of the material where the seams converge, and cooperating shear knives mounted below said platens for relative horizontal movement for severing the material into finished bags.

6. In a bag making machine for making bags from flattened tubular heat-sealable material, the combination comprising, means for advancing the material downwardly in a substantially vertical path, means including heat sealing elements and severing elements mounted on each side of the material and movable to engage the material therebetween for forming seams defining one end of the bags and for severing the material into bags, and means mounted below said elements for applying air under pressure in streams directed downwardly on each side of the material for supporting, guiding and assisting the advance thereof into position between said elements.

7. In a bag making machine for making bags from flattened tubular heat-sealable material, the combination comprising, means for advancing the material downwardly in a substantially vertical path, a pair of platens mounted respectively on each side of the path of the material, heat-seal elements carried by said platens for forming seams defining the neck of the bags, means for moving said platens together for clamping the material and engaging the heat-seal elements, means for severing the material into bags operated in timed sequence with said platens, means for applying air under pressure in streams directed downwardly on the material from above said platens for guiding and assisting the advance of said material to said platens, and means for applying air under pressure in streams directed downwardly on both sides of the material below said platens defining an air gate for guiding and assisting the advance of said material from said platens.

8. In a bag making machine for making bags from flattened tubular heat-sealable material, the combination comprising, means for advancing the material downwardly in a substantially vertical path, a pair of cooperating platens mounted respectively on each side of the path of the material, heat-seal elements carried by said platens for forming downwardly converging seams defining the neck of the bags, material severing elements mounted below said platens for cutting the material into finished bags, means defining a mechanical gate above said platens for guiding said material to said platens, and means defining an air gate below said material severing elements for guiding said material from said platens.

9. In a bag making machine for making bags from flattened tubular heat-sealable material, the combination comprising, a pair of grooved draw rolls for drawing the material downwardly in a substantially vertical path, sets of vertically disposed relatively stiff fingers positioned between the draw rolls in the grooves therein, said sets of fingers defining a mechanical gate for guiding the material along said path, a pair of cooperating platens mounted respectively on each side of the path of the material, heat-seal elements carried by said platens for forming downwardly converging seams defining the necks of the bags, a cut-off knife mounted below said platens for cutting the material defining the bottom of the bags, said platens and cut-off knife being operated in timed sequence with said draw rolls, to form the seams in the material at longitudinally spaced intervals, and for severing the material between the longitudinally spaced seams, and means defining an air gate below said platens for guiding said material from the platens.

10. In a bag making machine for making bags from a continuous flattened tube of relatively flexible heat-sealable material, the combination comprising, means defining a substantially vertical path for said material, a pair of draw rolls for drawing the material into the machine and downwardly along said paths, bag forming means including heat sealing elements mounted on each side of said path and movable intermittently into mutual engagement with the material therebetween, and means for applying air under pressure in converging streams directed downwardly along both sides of the material below said draw rolls and above said bag forming means for guiding said material along said path and for assisting flow of said material from said draw rolls to said bag forming means while said heat sealing elements are separated.

11. In a bag making machine for making bags from a continuous flattened tube of relatively flexible heat-sealable material, the combination comprising, a pair of grooved draw rolls for drawing the material downwardly in a substantially vertical path, sets of vertically disposed relatively stiff fingers positioned between the draw rolls in the grooves therein, said sets of fingers being positioned respectively on each side of said path for defining a gate for guiding said material along said path, and means for directing streams of air downwardly alongside said fingers and converging towards said path for assisting flow of said material.

12. In a bag making machine for making bags from a continuous flattened tube of relatively flexible heat-sealable material, the combination comprising, means defining a path for said material, a path of draw rolls for drawing the material into the machine along said path, and means for directing converging streams of air under pressure from both sides of said material in the direction of said path for assisting flow of said material from said draw rolls.

13. In a bag making machine for making bags from a continuous flattened tube of relatively flexible heat-sealable material, the combination comprising, means for advancing the material in a vertical path, sets of vertically disposed relatively stiff fingers positioned respectively on each side of said path for defining a gate for guiding said material along said path, and means for directing streams of air downwardly alongside said fingers and converging towards said path for assisting flow of said material.

14. In a bag making machine for making bags from a continuous flattened tube of relatively flexible heat-sealable material, the combination comprising, means defining a vertical path for said material, a pair of grooved draw rolls for drawing material downwardly along said path, sets of vertically disposed relatively stiff fingers positioned between the draw rolls in the grooves therein, said sets of fingers being positioned respectively on each side of said path for defining a gate for guiding said material along said path, means for directing streams of air downwardly alongside said fingers and converging towards said path for assisting flow of said material, a machine head below said fingers including means for sealing and severing the material in making bags, and means below said machine head for applying air under pressure in converging streams directed downwardly along both sides of the material for guiding said material from the machine head so that the finished bags are substantially vertical as they emerge from the machine head.

15. In a bag making machine for making bags from flattened tubular heat-sealable material, the combination comprising, means for advancing the material downwardly in a substantially vertical path, a pair of cooperating platens mounted respectively on each side of the path of the material, and operable to clamp the material, heat-seal elements carried by said platens for forming converging seams defining the necks of the bags, and a knife horizontally movable into contact with said material for severing a hanger slot between said converging seams while the material is clamped between the platens.

16. In a bag making machine for making bags from flattened tubular heat-sealable material, the combination comprising, means for advancing the material downwardly in a substantially vertical path, a pair of cooperating platens mounted respectively on each side of the path of the material and operable to clamp the material, heat-seal elements carried by said platens, cooperating shear knives mounted respectively on each side of the path of material and operable to sever the material while it is clamped between said platens and means for applying air under pressure in streams directed downwardly along both sides of the material for supporting the material during a severing operation.

17. In a bag making machine for making bags from flattened tubular heat-sealable material, the combination comprising, means for advancing the material downwardly in a substantially vertical path, cooperating shear knives mounted respectively on each side of the path of material and operable to sever the material, and means for applying air under pressure in streams directed downwardly along both sides of the material for guiding and supporting the material during a severing operation.

18. In a bag making machine for making bags from flattened tubular heat-sealable material, the combination comprising, means for feeding the material downwardly so that it hangs substantially vertically from said feeding means, transverse downwardly converging heat-sealing means mounted below said feeding means to receive said material therefrom and operable to engage said material and form a transverse seam including downwardly converging portions defining the neck closing one end of a bag, and cutting means for severing said material at a point spaced from said neck after the material is advanced downwardly following a seam-forming operation to cut off a bag.

19. In a bag making machine for making bags from a web of flattened tubular heat-sealable material, the combination comprising, means for feeding the material downwardly so that it hangs substantially vertically from said feeding means, and means for forming successive completed bags by repeated web cutting and seam forming operations at immediately adjacent points in the web including transverse converging heat-sealing means mounted below said feeding means to receive said web therefrom while hanging from said feeding means and operable to engage said web and form a transverse seam defining the neck closing one end of a bag, means including cutting elements mounted for web engagement substantially less than a bag length below said heat-sealing means, and means for operating said cutting elements and heat-sealing means in immediate succession so as to cut off one bag and form the closed end of a succeeding bag.

References Cited in the file of this patent

UNITED STATES PATENTS

| | | | |
|---|---|---|---|
| 2,019,843 | Clark | Nov. 5, | 1935 |
| 2,179,009 | Couch | Nov. 7, | 1939 |
| 2,200,971 | Sonneborn | May 14, | 1940 |
| 2,227,497 | Hallman | Jan. 7, | 1941 |
| 2,238,342 | Riehl | Apr. 15, | 1941 |
| 2,330,855 | Woolf | Oct. 5, | 1943 |
| 2,340,260 | Clunan | Jan. 25, | 1944 |
| 2,379,357 | Humphrey | June 26, | 1945 |
| 2,467,879 | Billeb | Apr. 19, | 1949 |
| 2,652,879 | Keller et al. | Sept. 22, | 1953 |
| 2,670,027 | Gigler | Feb. 23, | 1954 |
| 2,698,046 | Finke | Dec. 8, | 1954 |
| 2,824,596 | Crawford | Feb. 25, | 1958 |